US008818406B2

(12) United States Patent
Bevan et al.

(10) Patent No.: US 8,818,406 B2
(45) Date of Patent: Aug. 26, 2014

(54) TDOA BASED POSITIONING WITH CALCULATION OF CORRECTION FACTORS FOR COMPENSATING THE CLOCK OFFSETS OF UNSYNCHRONIZED NETWORK STATIONS

(76) Inventors: David Bevan, Bishops Stortford (GB); Simon Gale, Bishops Stortford (GB)

(*) Notice: Subject to any disclaimer, the term of this patent is extended or adjusted under 35 U.S.C. 154(b) by 64 days.

(21) Appl. No.: 13/513,875

(22) PCT Filed: Jan. 22, 2010

(86) PCT No.: PCT/EP2010/050747
§ 371 (c)(1),
(2), (4) Date: Aug. 14, 2012

(87) PCT Pub. No.: WO2011/069684
PCT Pub. Date: Jun. 16, 2011

(65) Prior Publication Data
US 2013/0137452 A1      May 30, 2013

(30) Foreign Application Priority Data

Dec. 10, 2009      (WO) ................. PCT/EP2009/066858

(51) Int. Cl.
*H04W 24/00*      (2009.01)
*H04M 3/42*      (2006.01)
(52) U.S. Cl.
USPC ...................................... 455/456.1; 342/450

(58) Field of Classification Search
USPC .................. 455/456.1–457, 404.1–404.2, 455/414.1–414.4
See application file for complete search history.

(56) References Cited

U.S. PATENT DOCUMENTS

| 6,275,705 | B1 | 8/2001 | Drane | |
| 7,203,499 | B2* | 4/2007 | Wigren | 455/456.1 |
| 8,326,324 | B2* | 12/2012 | Wu et al. | 455/456.2 |
| 8,331,953 | B2* | 12/2012 | Carlson et al. | 455/456.1 |
| 8,483,707 | B2* | 7/2013 | Krishnamurthy et al. | 455/456.1 |
| 2004/0046693 | A1 | 3/2004 | Ogino | |
| 2007/0087760 | A1* | 4/2007 | Ogino et al. | 455/456.1 |
| 2007/0176749 | A1 | 8/2007 | Boyd | |

FOREIGN PATENT DOCUMENTS

| RU | 2357267 C2 | 5/2009 |
| WO | 9714049 | 4/1997 |

* cited by examiner

*Primary Examiner* — Lee Nguyen
(74) *Attorney, Agent, or Firm* — Barnes & Thornburg LLP (57) ABSTRACT

The present invention presents a method, arrangement and computer program product for clocking exploiting the relative behavior of clocks of individual receiving stations as well as a corresponding modeling to derive a time difference of arrival of a signal from a user device which can be used to correct the time difference of arrival based on the modeled clock behavior and leads to a correct clocking of received user signals without the need of synchronization of the clocks in the various receiving stations. This principle is applicable to a plurality of pairs of receiving stations and beacon signals transmitted amongst them and allows for a correct location estimation of a user device.

17 Claims, 6 Drawing Sheets

TDOA BASED POSITIONING WITH CALCULATION OF CORRECTION FACTORS FOR COMPENSATING THE CLOCK OFFSETS OF UNSYNCHRONIZED NETWORK STATIONS

The present invention relates to wireless mobile networks or access points of a wireless local network having mobile user location functions, associated methods and computer program products.

TECHNICAL BACKGROUND

In recent times it has become increasingly important to determine the location of a user using a mobile device in order to provide appropriate services to users, such as restaurant or shop recommendation or to locate the user in order to provide emergency medical services. On the other hand it has also become important to locate a user to provide appropriate law enforcement regarding criminal subjects.

For determining the location of a mobile device commonly satellite supported methods have been established, such as using the Global Positioning System which is widely used to determine the position of cars and used for route planning and navigation. Such methods however have the disadvantage, that they require special receivers and transmitters which are only suitable for navigational purposes and require an additional technical effort as well in the user device and in terms of infrastructure to supply the corresponding satellites emitting proper navigation signals.

Due to the high competition in the mobile infrastructure and devices market there is a strong tendency among the competitors to keep mobile devices and their infrastructure technically simple, in order to remain cost-competitive on the market or to gain a competitive advantage. Therefore, there is a strong need to provide location services for mobile devices which are technically simple while at the same time being reliable and efficient as well as sufficiently accurate to determine the position of a user in order to be able to provide to him or her suitable services.

Accordingly methods have been established to determine the position of a user, by receiving a signal emitted by the user's mobile device at fixed receiver stations, and based on the different signal propagation from the user device to the different fixed receivers to calculate a position of the user device. In such an environment it is crucial that all the devices involved in the location determination are basing their corresponding analysis on a common clock. The positional accuracy of such a system is directly related to the accuracy of the clocks and the corresponding synchronicity of the clocks which are used to determine the propagation delays involved in the location determination.

One such method is based on a time difference of arrival TDOA and uses the time difference it takes for a signal to travel to two destinations as an indirect method of calculating a distance. With a minimum of three base stations, for instance, receiving the signal from a handset, the difference in time it takes for the signal to reach each tower of a base station can be used to triangulate the position of the mobile unit. TDOA systems do not need any specialized antennas and as such the infrastructure is kept simple. When a mobile that has to be located transmits, the arrival time of the target mobile signal is recorded by a TDOA location measuring unit at each base station or access point which is able to receive the signal. Since the mobile's signal travels at a constant speed (the speed of light), comparison of the arrival time of the signal for any two sides allows a straightforward calculation to determine the mobile's relative position to each side. When plotted, this relationship describes an imaginary hyperbola in space. The target mobile is located somewhere on this curve although additional information is required to determine precisely where. When the same calculation is made involving measurements from a third base station or access point side, calculating a difference of arrival time from sites A, B, C, e.g. between either sites A and C or between sites B and C, an independent positional hyperbola can be described. The point at which the two hyperbolas AB and BC intersect is the location of the target mobile. Commonly, TDOA requires accurate time synchronization at the base station or access points, but not necessarily at the target mobile device. It is immediately apparent, that inaccuracies in the clock measurements may lead to large location errors. A high clock accuracy and the corresponding master clock and an associated synchronization procedure require however technically complicated solutions which on the other hand require adaptations at the infrastructure devices such as base stations and for instance access points in order to provide them with a suitable clock reference.

SUMMARY OF THE INVENTION

Therefore, there exists a need to provide a location estimation of a mobile device without the requirement of clock synchronization or expensive master clocks.

This problem is solved by a method for clocking according to claim 1, by an arrangement for clocking according to claim 13 or 15, and by a computer program product for clocking according to claim 17.

Further advantageous developments of the invention are given in the dependent claims.

Advantageously the method according to the present invention exploits the fact that base stations of a wireless mobile network or access points of a wireless local network are located at known positions and thus are situated in a fixed positional relationship. This allows to calculate signal propagation delays of beacon signals transmitted amongst those stations and received individually. These are calculated based on the known signal propagation speed and the respective distance between the stations.

Additionally, determining the time difference of arrival allows determination of the relation of local clocks of two individual receiving stations to each other and requires no absolute values. Thus, by measuring the reception times of uniquely identified signals at individual receiving stations, a relative clock behavior of pairs of individual receiving stations can be modeled and exploited together with the absolute known time difference of arrival to calculate a correction value for a signal received from a mobile device of a user by the respective base stations or wireless access points to correct the corresponding time difference of arrival for the user signal. Consequently, the method according to the present invention solves the problem of the present invention with using no additional hardware only by relating suitable calculations of suitable measurements at the access points respectively base stations.

Expediently according to a further development of an example of the method according to the present invention a transmission and a time stamping of a plurality of signals is analyzed which advantageously provides for a higher accuracy in the model curve.

Beneficially according to a further development of the method of the present invention the signals are transmitted wirelessly over the air, which advantageously allows for a very simple infrastructure as no cables and wires need to be deployed.

Beneficially according to a further development of the method of the present invention the signal is embodied as a beacon signal, because this allows using normal wireless access points or base stations which already transmit beacon signals to be used in the context of the present invention.

Advantageously, according to a further development of the method according to the present invention a signal is a frame, as frames by nature provide the advantage to possess a unique identification property in their frame number and thus further ease the implementation of the method of the present invention in presently used transmission systems.

Further beneficially according to a development of the present invention the frame can be embodied as a frame according to a local area network protocol such as the IEEE 802.11 standard, as in this manner standards can be easily adapted by the present invention and commonly used transmission standards are suitable for incorporation in the method according to the present invention.

Advantageously for the modeling of the time difference of arrival of the method according to the present invention according to an embodiment, a polynomial with least squares may be used because such a polynomial is simple in its mathematical structure while at the same time satisfying the descriptive needs of the dependency of two clocks according to the method of the present invention without sacrificing any accuracy in the modeling process.

Expediently according to a further development of an embodiment of the method according to the present invention at least one signal is being transmitted before the arbitrary point in time and one is being transmitted after the arbitrary point in time in order to improve the accuracy of the clocking at the arbitrary point in time according to the method of the present invention.

Beneficially according to a further development of the method according to the present invention it is ensured that the same number of signals has been transmitted before the arbitrary point in time and after the arbitrary point in time to provide the utmost accuracy in the determination of the clocking according to a further embodiment of the method according to the present invention.

Expediently according to a further development of the method of the present invention the timing difference of arrival at a different pair of receiving stations is used to be able to accurately determine the location of a mobile station by a method of time difference of arrival based location determination. This allows the determination of two hyperbolas and their corresponding intersection point as the location of the mobile device.

The present invention provides an arrangement for clocking comprising:

at least a first, a second and a third device;

the first device having transmitting means for transmitting at least a first and a second signal with a unique identification;

the second and third devices having receiving means and a clock for receiving the at least first and second signals and processing means for associating a respective measured second and third local clock at the reception time of the respective signal to it, leading to at least two value pairs of local clocks of the second and third device;

modeling means for modeling based on the value pairs of local clocks a time function of a dependency of the second and third local clock over time as a first model curve;

the second and third device further being adapted to receiving at an arbitrary point in time a user signal from a user device at the second and third device and associating a reception time measured by the respective second and third local clock of the second and third device to the user signal upon its reception, leading to a user value pair of local clocks of the second and third device, processing means for calculating a reference time difference of arrival RTDOA for a signal from the first device received at the second and third device from the fixed positional relationship, based on the respective distance between the first and the second device and the first and the third device and the known signal propagation speed; and for calculating a user time difference of arrival UTDOA from the user value pair;

means for determining at the arbitrary point in time the value form the first model curve and based on this value calculating a determined time difference of arrival DTDOA;

wherein the processing means is adapted to relate the RTDOA and DTDOA to determine a current correction factor; and for clocking to use the current correction factor to correct the UTDOA.

Beneficially the arrangement according to the present invention comprises a minimum number of receiving devices to achieve the clocking according to the present invention which provides a simple infrastructure in a competitive manner capable to solve the problem of the present invention.

Advantageously, a further development of the arrangement according to the present invention allows employing a server for the computational intensive tasks that need to be performed, which on the other hand allows a further simplification of the receiving stations, and only requires corresponding communications of the respective identification of the received signals together with their associated time information to the computation server for calculating a location of the mobile device.

Advantageously the computer program product of the invention provides a simple means to implement the method of the present invention at respective base stations and access points by providing a means of storage and transport.

BRIEF DESCRIPTION OF THE DRAWINGS

Subsequently the invention will further be explained by means of examples and embodiments shown in drawings, wherein.

DESCRIPTION OF THE ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Figure 1:
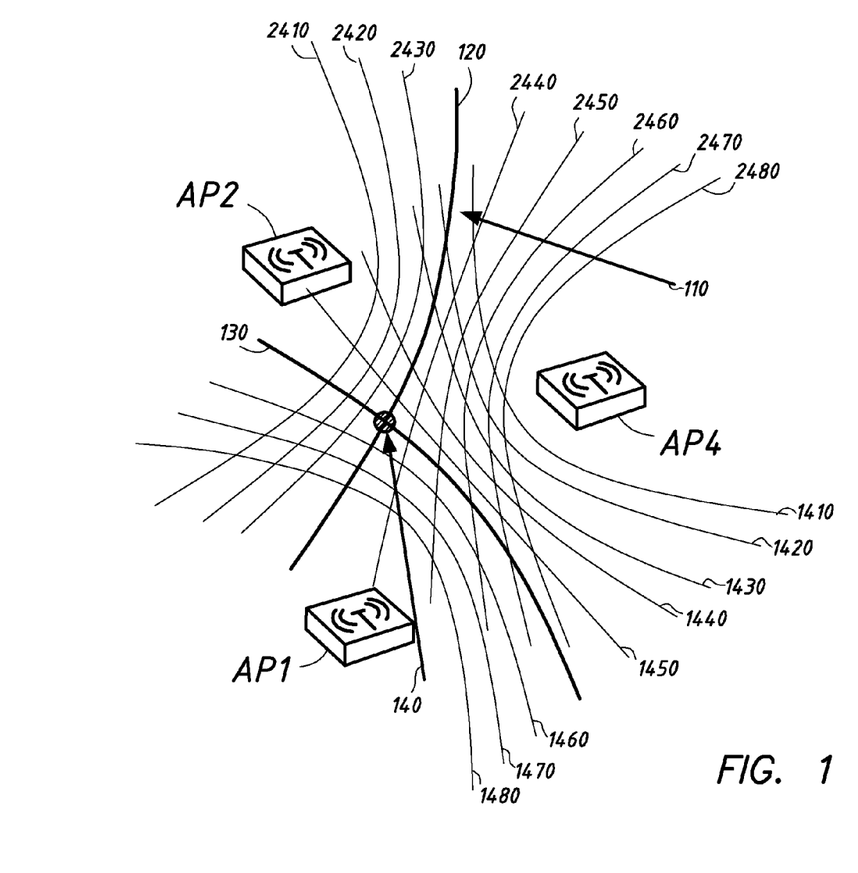
FIG. 1 shows a simple transmitter and receiver arrangement according to an embodiment of the present invention.

As an example given in FIG. 1, a basic configuration to embody the method of the present invention comprises or consists of three access points AP1, AP2 and AP4. Without limiting the invention these access points can be any stations that are capable of transmitting respectively receiving signals, e.g. wireless signals. The potential to be a transceiver, i.e. as well a transmitter as a receiver has certain advantages in terms of not having to have separate transmitting and receiving stations and thus providing an optimum use of resources. In this case the access points may be access points of a wireless LAN, e.g. according to the IEEE Standard 802.11. But without any limitation the access points may be stations that are capable of transmitting respectively receiving a signal, respectively a number of signals, especially wireless signals which can be provided with a unique identifier or at least an element that enables a signal to be identifiable as a unique signal. It is for instance conceivable that each signal has a different format and thus the unique identifier of the signal to be a unique signal is the format.

In this case the station AP4 transmits a unique signal, respectively a sequence of unique signals that is/are received by stations AP2 and AP1. Upon reception of the unique signal or signals, by means of their local clock, the respective stations AP1 and AP2 associate the unique signal with a time measured by their local clock that has been measured at the time of reception of the unique signal. Without any limitation such an association may be performed for one, two or a plurality of unique signals in order to protocol a dependency of the local clocks of the stations AP2 and AP1 in association to a joint reception of the same individual unique signal from the station AP4.

Often at wireless access points, such as the stations AP1, AP2 and AP4, these have a simple construction and thus only low cost clocking devices are employed, which has the disadvantage, that these clocks are subject to a temperature drift to a clock inaccuracy drift, e.g. to a phase drift, and/or to a frequency drift of the clock, which imposes a certain inaccuracy of the clocking of the individual stations AP1 to AP4.

The absolute offsets and rate differences of the various clocks of the stations AP1 to AP4 may be quantified in microseconds of drift per second, or equivalently, parts per million PPM. These offsets can be accumulated or built up and maintained over long periods of many seconds or minutes when they are measured. This provides accurate measurement. The accumulated offsets or any related value thereto can be stored, e.g. in an optional location engine. The location engine may be implemented in the form of a server performing the calculation of the time difference of arrival at the various stations.

For the time difference of arrival measurement, a time difference of the signal flight times between a user device (not shown), which may be implemented as a mobile device, and two or more receiving stations, for instance AP2, AP1, and AP4 may be calculated.

In FIG. 1 hyperbolas marked from 2.410 to 2.480 indicate lines of constant delay differences between AP2 and AP4 whereas hyperbolas marked from 1.410 to 1.480 mark lines of constant delay difference between stations AP1 and AP4. As indicated by 110 in the given example the user's position should be somewhere on hyperbola 120. On the other hand as also indicated by 140 the user's position should also be somewhere on the hyperbola marked by reference sign 130. Therefore, at the intersection of hyperbolas 110 and 130 the user's position also indicated by reference sign 140, respectively the position of the mobile device of the user, can be identified.

The embodiment of the present invention exploits the fact, that the distances between the known stations AP1 to AP4 are known, as they are in a fixed positional relationship and that based on the separation distances of the stations between each other, an accurate propagation time of a correspondingly transmitted signal can be calculated by taking the distance and the propagation speed. By establishing a time difference of arrival based on an accurate calculation allows the establishment of a relationship of this accurate time difference of arrival to a time difference of arrival that has been measured by the inaccurate clocks of the two stations in question. Based on a model of the time dependency of the time difference of arrival at the two receiving stations, an analysis can be made to identify a corresponding error value in the time difference of arrival measured by the inaccurate clocks of the two receiving stations. Further, based on the accurate calculation the system is able to compute a correction value and thus to derive an accurate time difference of arrival at an arbitrary point in time regarding these two receiving stations. For instance, this can be achieved by relating the correct values at an arbitrary point in time to the modeled value at this point in time to calculate the current correction value. Mathematical operations in this context are preferably division to relate the values and multiplication to calculate the corrected time difference of arrival for a signal received from a user device with the current correction value.

Such a process may be performed for any two receiving stations that are part of the configuration shown in the embodiment of FIG. 1.

Consequently, according to the present invention no absolute values are required to be determined and instead only the relative clock behavior between any two receiving stations needs to be determined. Of course the time difference of arrival can also be determined by a user device, which on the other hand requires a number of further provisions for receptions and forwarding of the corresponding data to and/or from the user device. In order to perform an accurate location estimation of a user device a timing accuracy in the order of 1 ns which corresponds to one third of a meter is preferably required.

Figure 2:
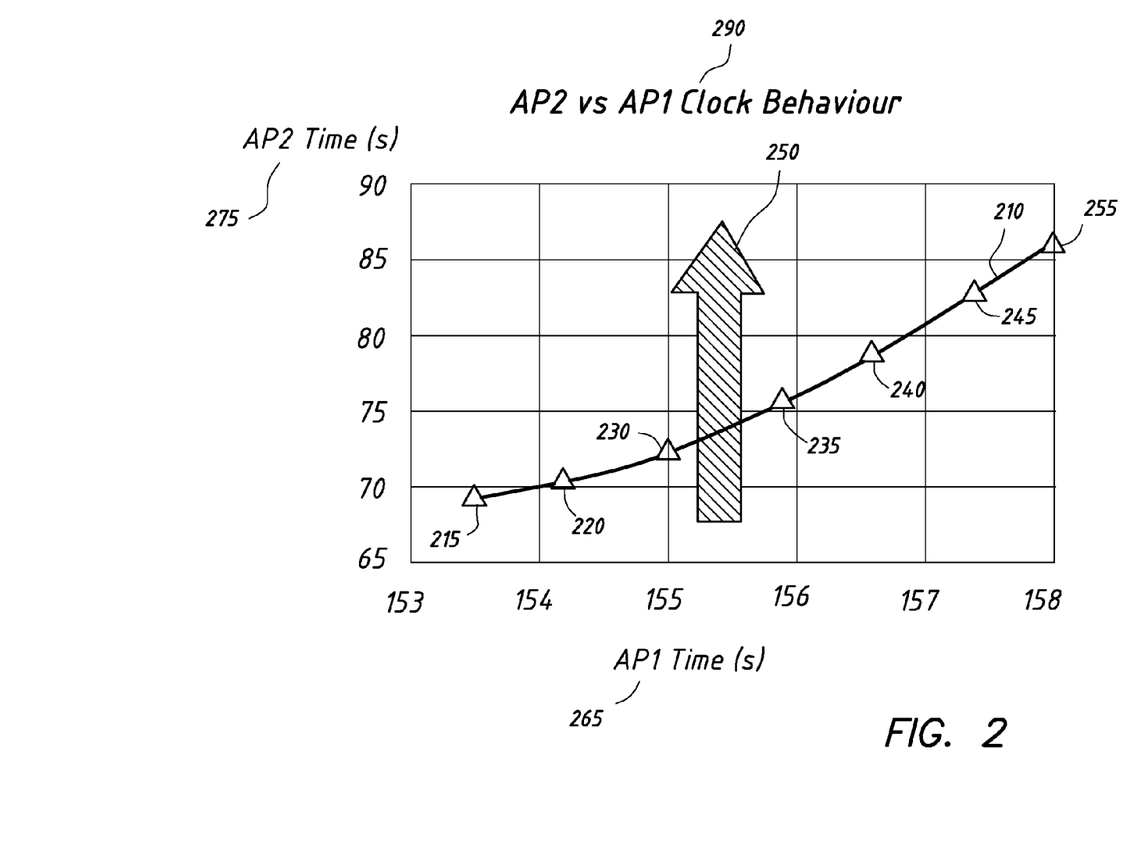
FIG. 2 gives an example of a relative clock behaviour of two receiving stations.

FIG. 2 gives an example of a clock behavior at two stations AP1 and AP2 indicated by reference sign 290. On the vertical axis the local time of the clock at station AP2 is marked by 275 and on the horizontal axis the time at station AP1 is marked by 265. The triangles in the diagram indicated by reference signs 215, 220, 230, 235, 240, 245 and 255 represent the reception times of unique signals at the station AP1 respectively AP2. If the clocks at AP1 and AP2 were performing correctly and very accurately, there would be no curve connecting the triangles and they would all lie on a straight line.

In this case the known propagation time of the signal based on a calculation of the signal propagation speed and the distance between respectively AP4 and AP2 and AP4 and AP1 have been subtracted from the reception times of the signal, which may be a beacon signal from AP4. As the locations of the station are known such a calculation can be easily performed by a skilled person. It is also conceivable, that the curve represented by reference sign 210 connecting the various triangles can be modeled by any suitable regression or interpolation method, e.g. by a simple polynomial. However, other suitable modeling techniques are conceivable like value approximation by a neural network trained with the value pairs of measured local clocks. Reference sign 250 indicates the time as an arbitrary point in time at which a signal from a mobile device of a user is received at the respective stations AP1 and AP2. A smooth curve between measurements can be obtained by polynomial curve fit which yields a time difference between AP1 and AP2 at a user observation time.

Figure 3:
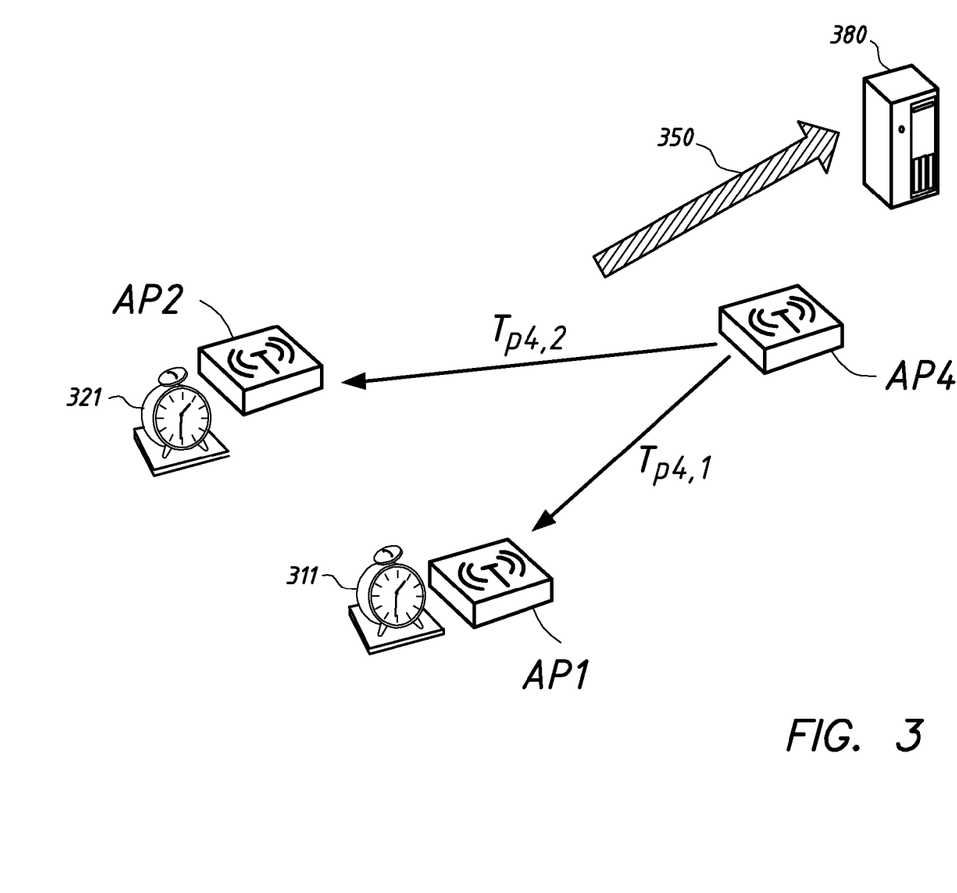
FIG. 3 shows an example of signal transmission according to an embodiment of the present invention.

Such a dependency of the inaccurate local clocks is for instance further explained in the configuration shown in FIG. 3. In particular here a local clock of station AP2 referenced by 321 and a local clock of station AP1 referenced by 311 is shown. It is further indicated, that a signal propagation time between AP4 and AP2 marked by reference sign $T_{p4,2}$ is known based on a calculation of the distance and the propagation speed, which also holds true for the propagation time of a signal transmitted between AP4 and AP1 indicated by $T_{p4,1}$. The measurements taken for a signal transmitted from station AP4 and the associated timing can for instance be transmitted to a server indicated by reference sign 380 performing the required calculations as well as a suitable modeling function such as a regression analysis of which a polynomial curve fit is one example whereas the transmission is exemplified by an arrow marked by reference sign 350. For instance, a relative clock behavior may be obtained by over air measurements.

For instance, a propagation time correction may be performed in the following manner. It may be assumed, that there are two receiving stations AP1 and AP2 at known locations. The clocks of AP1 and AP2 are ticking in nano seconds and are not synchronized with each other. Thus they are drifting in time with respect to each other. On the other hand both AP1 and AP2 are each able to accurately time stamp the same received signal for instance in form of a frame from a single transmitting station AP4. It is known based on the signal propagation speed and the distance between the stations that a frame transmitted by AP4 propagates 0.3 m in 1 ns and thus AP4 being 30 m apart from AP1 and 18 m apart from AP2 leads to a propagation delay from AP4 to AP1 which is 30 m/0.3 m/ns=100 ns whereas the propagation delay from AP4 to AP2 is 18 m/0.3 m/ns=60 ns. For instance, AP1 time stamps a frame received from AP4 with the reading of 629,154,927 ns whereas AP2 time stamps the same frame received from AP4 with the reading of 402,549,572 ns. In this case AP1 for instance calculates that its clock reading at the same time that AP4 transmitted the frame was 629,154,927−100=629,154, 827 ns, whereas AP2 calculates that its clock reading at the same time that AP4 transmitted the frame was 402,549,572− 60=402,549,512 ns. This leads to the result that at the instant that the clock of AP1 was reading 629,154,827 ns the clock of AP2 was reading 402,549,512 ns and vice versa. The calculation of a known propagation delay can however be subtracted at any time in the calculation process because it remains a known constant in case the position of the stations remain constant which is a prerequisite. Thus a different order in the sequence of the calculations is always possible. The fitting of a regression curve such as a polynomial curve to an observed relative AP clock behavior may be performed in the following manner. Preferably, a relative clock behavior is monitored over a segment of time containing n observations that span the instant when a relative timing of a user observation needs to be established. For instance, if the recorded n observation times, which eventually need to be corrected for known propagation times of the same beacon transmissions, are indicated by $T_{AP1,i}$ and $T_{AP2,i}$, a polynomial curve may be fitted to the observed data which is, for example, a least squares fit to the observed data, e.g. in form of $$T_{AP2}=a_0+a_1 T_{AP1}+a_2 (T_{AP1})^2.$$

Then the coefficients $a_0$, $a_1$ and $a_2$ can readily be obtained from the observed data using a least squares matrix technique by:

$$a=(X^T X)^{-1} X^T Y$$

where a is a column vector consisting of $a_0$, $a_1$, and $a_2$, Y is a column vector of the n AP2 observations of $T_{AP2,1}$ to $T_{AP2,n}$ and X is an n×3 matrix formed from the AP1 observations e.g.:

$$X = \begin{pmatrix} 1, & T_{AP11}, & (T_{AP11})^2 \\ 1, & T_{AP12}, & (T_{AP12})^2 \\ \vdots & \vdots & \vdots \\ 1, & T_{AP1n}, & (T_{AP1n})^2 \end{pmatrix}$$

Further details can be obtained from according to http://mathworld.wolfram.com/LeastSquaresFittingPolynomial.html.

In this example a second order polynomial is used wherein: $a_0$ represents a fixed time offset; $a_1$ represents a fixed frequency offset and $a_2$ represents a linear frequency drift with time. Without restricting the invention, it is also possible to use higher orders of polynomials although a second order solution is likely to be good enough giving the shape of the curve shown in FIG. 2 which is not a complicated curve. However, there is a dependency between the order of the polynomial and a number of measurement observations that are required for its determination for a $J^{th}$ order polynomial at least J+1 measurement observations are required. Preferably in practice more measurement observations are needed if the impact of measurement noise needs to be reduced.

Figure 4:
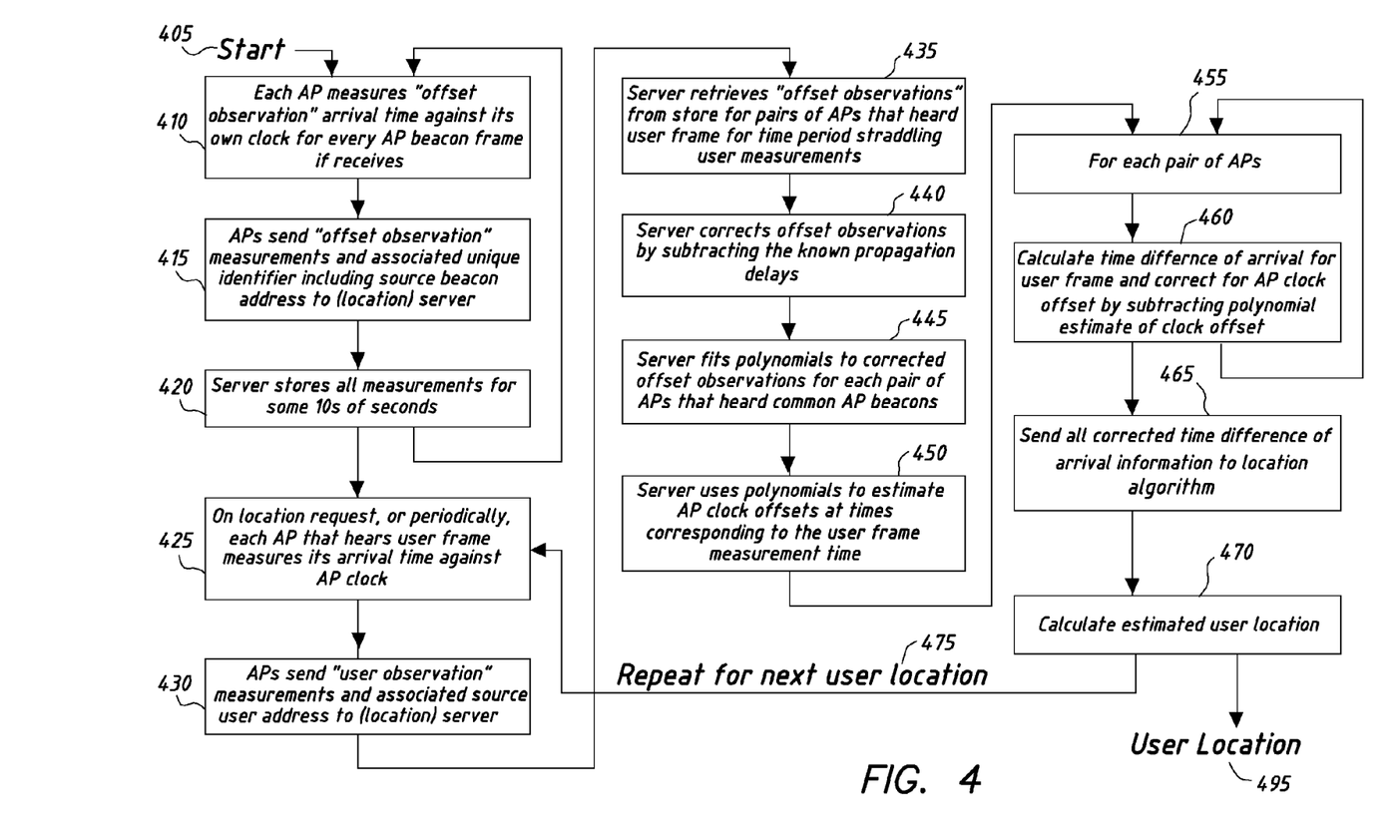
FIG. 4 shows a flow-chart explaining the estimation of a user location based on a time difference of arrival according to an embodiment of the present invention.

FIG. 4 shows an example of a position determination process in a flow-chart according to an embodiment of the present invention.

At 405 the process is started. At 410 each station measures its inaccurate signal arrival time against its own clock for every signal it receives. At 415 in this embodiment the stations send the observations meaning the arrival time of the individual signal and the associated signal identification for instance to a location server which may be employed to calculate a location. At 420 in this case the server stores all measurements over a period of time, for instance for the period of some 10 s of seconds. At 425, in case of a location request (or alternatively periodically), each station receiving a suitable signal e.g. a user frame, measures the arrival time of each particular user frame, representative of a user signal using its local clock and at 430 sends the observed user signal measurement and the associated identification as well as time to the location server. At 435 the server retrieves the values stored for signal transmission between the wireless stations corresponding to the wireless stations that have received the user signal and at 440 corrects the observation regarding the retrieved communication between the wireless station by subtracting the known propagation delays based on propagation speed and positional relationship, respectively known distances. Subsequently at 440 a regression analysis such as fitting a polynomial is carried out on the corrected value pairs for each pair of wireless stations which received the common intercommunication between the wireless stations. At 450 the server, for instance, uses the polynomials to estimate the clock offsets of the wireless stations at times corresponding to the time where the user signal was received. At 455 for each pair of wireless stations at 460 a time difference of arrival for the user signal is calculated and corrected for the factor determined on the basis of the stored values from the corresponding pair of wireless stations and the calculated polynomial estimate of the clock offset. At 465 the corrected time difference of arrivals information are transmitted to the location algorithm and at 470 the estimated user location is calculated by intersecting the two hyperbolas as shown in FIG. 1 but marked by reference sign 120 and 130 to determine the user location indicated by arrow 140 which is retrieved at 495. Marked by 475 such a process may be repeated to determine various user locations.

Figure 5:
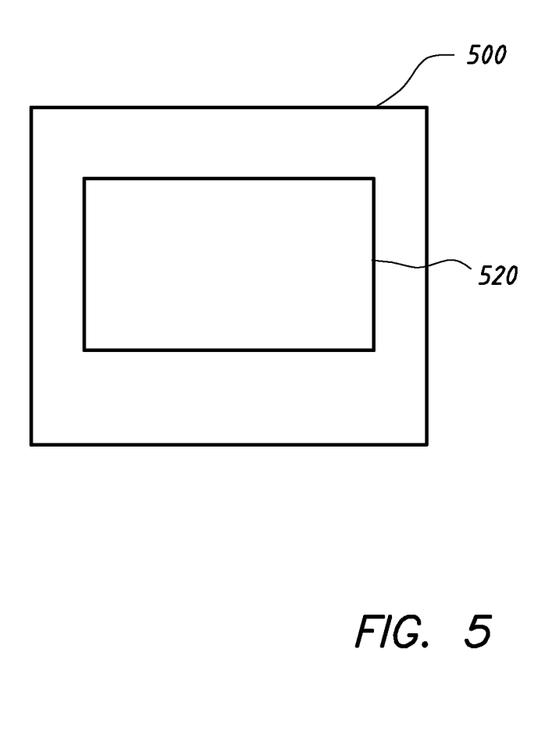
FIG. 5 gives an example of a computer program product according to the present invention.

FIG. 5 shows an example of a computer program product according to the present invention. Reference sign 500 indicates a data carrier which comprises a program code 520 representative of any of the method steps according to the present invention. Such a computer program product constitutes a simple entity to transport the method of the present invention and to implement it on the transmitting and receiving stations AP1 to AP4 of the present invention in case they are equipped with a network interface or a corresponding data reader. The data carrier of the present invention may be a suitable data carrier such as a magnetic- or optical medium or a hardware storage medium such as a flash storage. It may also be represented by a signal that is transmitted on a network according to a certain network protocol implemented on a wired network or on a wireless network for downloading the program code from one computer to another computer.

Figure 6:
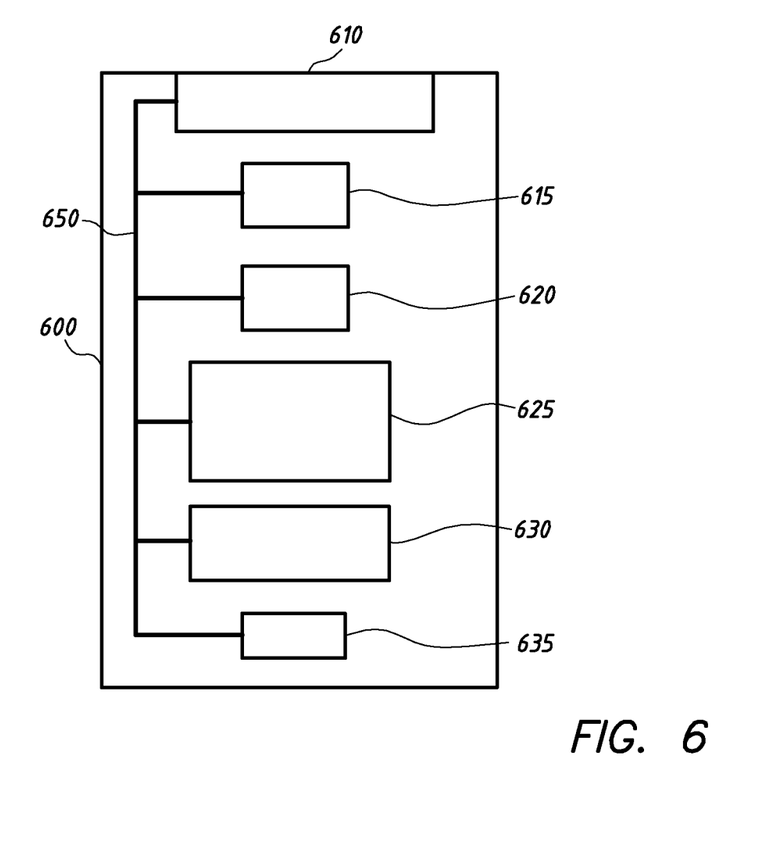
FIG. 6 gives an example of a device of an arrangement according to the present invention.

FIG. 6 shows an example of a station that may be employed in an arrangement according to the present invention. Reference sign 600 indicates a wireless station e.g. an access point or any other wireless or wire bound device capable of transmitting and/or receiving unique signals preferably identifiable by a unique identifier such as e.g. a frame number. It has an input/output interface 610 of any kind be it mechanical electrical or user specific for data entry and display. Further the station contains a receiver 615 and a transmitter 620 for instance capable of emitting and receiving in the GSM, Bluetooth or WLAN range of frequencies, or to handle standard packet communication over wire or optical media. A controller or processor 625 is capable to control the functions of the station 600 and has the power to perform the required computations. Further a memory 630 is present which may be any optical semiconductor or magnetic device for storing communication and operation data. Reference sign 635 indicates a power supply which may be a battery or a transformer connected to a wall outlet. All the internal components are connected by a suitable system bus 650 ensuring the proper operation of the station 600. In a similar manner as the station 600 a computation server 380 may be equipped with one or all of the components 610, 615, 620, 625, 630 and 650 dimensioned in a corresponding manner to perform a location determination of a user device and the required communication.

The invention claimed is:

1. Method for clocking involving at least a first device, a second device and a third device in a fixed positional relationship, the method comprising:
   at least the first device transmitting a sequence of unique signals comprising at least a first and a second signal having a unique identification;
   measuring the reception times of the uniquely identified signals at at least the second and third device with a respective second and third local clock of the second and third devices,
   at least the second and third device associating a reception time of the second and third device to respectively the first and the second signal upon reception thereof, leading to at least two value pairs of local clocks of the second and third device;
   based on the value pairs of local clocks, modeling a time function of a dependency of the second and third local clock over time as a first model curve;
   at an arbitrary point in time receiving a user signal from a user device at the second and third device and associating a reception time measured by the respective second and third local clock of the second and third device to the user signal upon its reception, leading to a user value pair of local clocks of the second and third device;
   calculating a reference time difference of arrival RTDOA for a signal from the first device received at the second and third device from the fixed positional relationship, based on the respective distance between the first and the second device and the first and the third device and the known signal propagation speed;
   calculating a user time difference of arrival UTDOA from the user value pair;
   at the arbitrary point in time determining a value from the first model curve and based on this value calculating a determined time difference of arrival DTDOA;
   relating the RTDOA to the DTDOA to determine a current correction factor; and
   for clocking using the current correction factor to correct the UTDOA.

2. Method according to claim 1, wherein more than two signals are transmitted; and wherein a respective model curve is modeled for all signals.

3. Method according to claim 2, wherein the modeling of the time function involves a least squares fit of a polynomial.

4. Method according to claim 2, wherein the same number of signals is being transmitted before and after the arbitrary point in time.

5. Method according to claim 1, wherein the signals are transmitted over the air.

6. Method according to claim 1, wherein the signals comprise a beacon signal.

7. Method according to claim 6, wherein the beacon signal is a frame.

8. Method according to claim 7 wherein the frame is a frame according to the wireless standard IEEE 802.11.

9. Method according to claim 6, wherein the unique identification is a frame number.

10. Method according to claim 1, wherein at least one signal is being transmitted before the arbitrary point in time and at least one after.

11. Method according to claim 1, involving a fourth device in a fixed positional relationship with the first to third devices and modeling a second model curve and calculating a second user TDOA regarding a constellation of the fourth device and the second device or the third device.

12. Method according to claim 11, for determining the location of a user device based on the first and the second user TDOA.

13. Computer program product comprising a non-transitory hardware storage medium on which a program code is stored, which when read and executed by a computer performs the method according to claim 1 as process steps.

14. Arrangement for clocking comprising:
at least a first, a second and a third device in a fixed positional relationship;
the first device having a transmitter for transmitting a sequence of unique signals comprising at least a first and a second signal with a unique identification;
the second and third devices having a receiver for receiving the at least first and second signals and a respective second and third local clock of the second and third device for measuring the reception times of the uniquely identified signals at at least the second and third device, and a processor for associating a reception time measured by the respective second and third local clock of the second and third device to respectively the first and second signal it upon reception thereof, leading to at least two value pairs of local clocks of the second and third device;
the processor for modeling based on the value pairs of local clocks a time function of a dependency of the second and third local clocks over time as a first model curve;
the second and third device further being adapted for receiving at an arbitrary point in time a user signal from a user device at the second and third devices and associating a reception time measured by the respective second and third local clocks of the second and third devices to the user signal upon its reception, leading to a user value pair of local clocks of the second and third devices,
the processor being adapted to calculate a reference time difference of arrival RTDOA for a signal from the first device received at the second and third devices from the fixed positional relationship, based on the respective distance between the first and the second devices and the first and the third devices and the known signal propagation speed; and to calculate a user time difference of arrival UTDOA from the user value pair;
the processor further being adapted to determine at the arbitrary point in time a value from the first model curve and based on this value to calculate a determined time difference of arrival DTDOA;
wherein the processor is further adapted to relate the RTDOA and DTDOA to determine a current correction factor; and
for clocking to use the current correction factor to correct the UTDOA.

15. Arrangement according to claim 14, comprising a server equipped with the processor to perform calculations and modeling connected to the devices.

16. Arrangement for clocking comprising:
at least a first, a second and a third device in a fixed positional relationship;
the first device having transmitting means for transmitting a sequence of unique signals comprising at least a first and a second signal with a unique identification;
the second and third devices having receiving means for receiving the at least first and second signals, a respective second and third local clock of the second and third device for measuring the reception times of the uniquely identified signals at at least the second and third device, and processing means for associating a reception time measured by the respective second and third local clocks of the second and third device to respectively the first and second signal upon reception thereof, leading to at least two value pairs of local clocks of the second and third devices;
modeling means for modeling based on the value pairs of local clocks a time function of a dependency of the second and third local clock over time as a first model curve;
the second and third devices further being adapted for receiving at an arbitrary point in time a user signal from a user device at the second and third devices and associating a reception time measured by the respective second and third local clocks of the second and third devices to the user signal upon its reception, leading to a user value pair of local clocks of the second and third devices,
processing means for calculating a reference time difference of arrival RTDOA for a signal from the first device received at the second and third devices from the fixed positional relationship, based on the respective distance between the first and the second device and the first and the third device and the known signal propagation speed; and for calculating a user time difference of arrival UTDOA from the user value pair;
means for determining at the arbitrary point in time a value from the first model curve and based on this value calculating a determined time difference of arrival DTDOA;
wherein the processing means is adapted to relate the RTDOA and DTDOA to determine a current correction factor; and
for clocking to use the current correction factor to correct the UTDOA.

17. Arrangement according to claim 16, wherein the processing means includes a server connected to the devices to perform calculations and modeling.

* * * * *